(12) United States Patent
Wang et al.

(10) Patent No.: US 12,367,488 B2
(45) Date of Patent: Jul. 22, 2025

(54) ENCRYPTION METHOD AND DECRYPTION METHOD FOR PAYMENT KEY, PAYMENT AUTHENTICATION METHOD, AND TERMINAL DEVICE

(71) Applicant: SHENZHEN PAX SMART NEW TECHNOLOGY CO., LTD., Guangdong (CN)

(72) Inventors: Huan Wang, Guangdong (CN); Aiping Zhou, Guangdong (CN); Youren Chen, Guangdong (CN)

(73) Assignee: SHENZHEN PAX SMART NEW TECHNOLOGY CO., LTD., Guangdong (CN)

( * ) Notice: Subject to any disclaimer, the term of this patent is extended or adjusted under 35 U.S.C. 154(b) by 215 days.

(21) Appl. No.: 18/027,962

(22) PCT Filed: Oct. 13, 2021

(86) PCT No.: PCT/CN2021/123462
§ 371 (c)(1),
(2) Date: Mar. 23, 2023

(87) PCT Pub. No.: WO2022/078367
PCT Pub. Date: Apr. 21, 2022

(65) Prior Publication Data
US 2023/0368194 A1  Nov. 16, 2023

(30) Foreign Application Priority Data
Oct. 14, 2020  (CN) .......................... 202011099201.3

(51) Int. Cl.
*G06Q 20/38* (2012.01)
(52) U.S. Cl.
CPC ... *G06Q 20/3829* (2013.01); *G06Q 20/38215* (2013.01)

(58) Field of Classification Search
CPC ............. G06Q 20/3829; G06Q 20/341; G06Q 20/38215; H04L 9/30; H04L 9/14; H04L 9/3263
See application file for complete search history.

(56) References Cited

U.S. PATENT DOCUMENTS 10,643,001 B2 * 5/2020 Guglani .............. G06F 21/6245
2015/0310431 A1  10/2015 Lakshmanan et al.
(Continued)

FOREIGN PATENT DOCUMENTS

CN  106850522 A   6/2017
CN  107087432 A * 8/2017 ........... G06F 21/335
(Continued)

OTHER PUBLICATIONS

Billet; Cryptanalysis of a White Box AES Implementation, Lecture Notes in Computer Science, 2004, p. 227-240, Article 227.*

*Primary Examiner* — Ilse I Immanuel
(74) *Attorney, Agent, or Firm* — Brooks Kushman P.C.

(57) ABSTRACT

An encryption method and a decryption method for a payment key are provided. The encryption method includes: generating an AES file key and an AES key through a key store management system; generating, by the back-end system, a SM4 white box secret key, a SM2 public key and a SM2 private key and saving the SM2 private key; receiving the SM4 white box secret key and the SM2 public key sent by the back-end system; encrypting, by using the AES file key, the SM4 white box secret key and the SM2 public key to generate and save a ciphertext of the SM4 white box secret key and the SM2 public key; encrypting, using the SM4 white box secret key, the AES key and the SM2 public key, a plaintext of the payment key issued by an electronic payment system to generate and save a ciphertext of the payment key.

4 Claims, 7 Drawing Sheets

(56) References Cited

U.S. PATENT DOCUMENTS

2016/0162669 A1* 6/2016 Mikhailov .............. G06F 21/12
          713/2
2021/0365938 A1* 11/2021 Radu .................. G06Q 20/3829

FOREIGN PATENT DOCUMENTS

| CN | 107181754 A | 9/2017 |
| CN | 108616516 A | 10/2018 |
| EP | 3447667 A1 | 2/2019 |

* cited by examiner

ENCRYPTION METHOD AND DECRYPTION METHOD FOR PAYMENT KEY, PAYMENT AUTHENTICATION METHOD, AND TERMINAL DEVICE

CROSS-REFERENCE TO RELATED APPLICATIONS

The present application is a 35 U.S.C. § 371 national stage application of PCT patent application No. PCT/CN2021/123462, filed on Oct. 13, 2021, which claims priority to Chinese patent application No. 202011099201.3, filed on Oct. 14, 2020. The entire contents of which are incorporated herein by reference.

FIELD

The present application relates to the technical field of secret keys, and more particularly, to an encryption method for a payment key, a decryption method for a payment key, a payment authentication method and a terminal device.

BACKGROUND

Key is a parameter that is input in an algorithm of converting a plaintext into a ciphertext or converting a ciphertext into a plaintext. Keys are classified into a symmetric key and asymmetric keys. The symmetric key is also referred to as a private key or a session key. An information transmitter and an information receiver use the same key for data encryption and data decryption. The greatest advantage of the symmetric key is that the symmetric key has a fast encryption/decryption speed and is suitable for encrypting large amounts of data. However, it is difficult to manage the symmetric key. The asymmetric keys, which are also called as public keys, require different keys to complete encryption and decryption operations, respectively. One key is published publicly and is referred to as the public key, and the other key is saved secretly by a user, and is referred to as the private key. The information transmitter uses the public key to perform data encryption, while the information receiver uses the private key to perform data decryption. The mechanism of the asymmetric key is flexible. However, encryption speed and decryption speed of the asymmetric key are much slower than that of the symmetric key. In practical application, symmetric key and asymmetric keys are usually used together. The symmetric key is used for storing a large amount of data information, while the asymmetric keys are used for encrypting keys. Keys are widely used in the field of electronic payment. It is the key to ensure the security of the electronic payment to protect the electronic payment key from being exposed and used without authorization.

SUMMARY

In view of this, an encryption method for a payment key, a decryption method for a payment key, a payment authentication method and a terminal device are provided in the embodiments of the present application, so that encipherment protection for a payment key issued by an electronic payment system can be realized, and a protection strength of the payment key can be improved.

In the first aspect of the embodiments of the present application, an encryption method for a payment key is provided, the encryption method includes:

generating an advanced encryption standard (AES) file key and an AES key through a key store management system;

sending, by an electronic payment application of the terminal device, a key generation request to a back-end system; and generating, by the back-end system, a SM4 white box secret key, a SM2 public key and a SM2 private key in response to the key generation request, and saving the SM2 private key;

receiving, by the electronic payment application of the terminal device, the SM4 white box secret key and the SM2 public key sent by the back-end system;

encrypting, by the electronic payment application of the terminal device, the SM4 white box secret key and the SM2 public key by using the AES file key to generate and save a ciphertext of the SM4 white box secret key and the SM2 public key; and encrypting, by the electronic payment application of the terminal device, a plaintext of the payment key issued by an electronic payment system by using the SM4 white box secret key, the AES key and the SM2 public key to generate and save a ciphertext of the payment key in a private file of the electronic payment application.

In the second aspect of the embodiments of the present application, a decryption method for a payment key is provided. The decryption method is implemented based on the encryption method for the payment key according to the first aspect of the embodiments of the present application, and includes:

reading a conserved ciphertext of the payment key by the electronic payment application of the terminal device;

sending, by the electronic payment application of the terminal device, the ciphertext of the payment key to the back-end system and decrypting, by the back-end system, the ciphertext of the payment key for a first time by using the SM2 private key;

receiving, by the electronic payment application of the terminal device, the ciphertext of the first decrypted payment key, which is sent by the back-end system; and decrypting, by the electronic payment application of the terminal device, the ciphertext of the first decrypted payment key again by using an AES key and a SM4 white box secret key to obtain a plaintext of the payment key.

In the third aspect of the embodiments of the present application, a payment authentication method is provided, the payment authentication method is implemented based on the decryption method for the payment key according to the second aspect of the embodiments of the present application. The payment authentication method includes:

collecting payment data by a terminal device;

encrypting, by an electronic payment application of the terminal device, the payment data by using the plaintext of the payment key to generate a ciphertext of the payment data;

encrypting, by the electronic payment application of the terminal device, transaction data and the ciphertext of the payment data to generate transaction information;

uploading the transaction information to an electronic payment system by the electronic payment application of the terminal device; by the electronic payment system, decrypting the transaction information, obtaining the transaction data and the payment data, verifying whether the payment data is legalized, authorizing a transaction corresponding to the transaction data when the payment data is legalized, or refusing the transaction corresponding to the transaction data and generating payment feedback information when the payment data is illegal; and receiving, by the electronic payment application of the terminal device, the payment feedback information issued by the electronic payment system.

In the fourth aspect of the embodiments of the present application, a terminal device is provided. The terminal device includes a memory, a processor, and a computer program stored in the memory and executable by the processor. The processor is configured to, when executing the computer program, implement the steps of the method according to any one of the first aspect, the second aspect and the third aspect.

In the fifth aspect of the embodiments of the present application, a non-transitory computer-readable storage medium is provided. The computer-readable storage medium stores a computer program. When the computer program is executed by a processor, the processor is configured to implement the method according to any one of the first aspect, the second aspect and the third aspect.

According to the encryption method for the payment key provided in the first aspect of the embodiments of the present application, the AES file key and the AES key are generated through the key store management system. Then, the key generation request is sent to the back-end system. The back-end system generates the SM4 white box secret key, the SM2 public key and the SM2 private key in response to the key generation request and saves the SM2 private key. The SM4 white box secret key and the SM2 public key sent by the back-end system are received. Then, the AES file key is used to encrypt the SM4 white box secret key and the SM2 public key to generate and save the ciphertext of the SM4 white box secret key and the SM2 public key. The SM4 white box secret key, the AES key and the SM2 public key are used to encrypt the plaintext of the payment key issued by the electronic payment system, and the ciphertext of the payment key is generated and saved. The encipherment protection can be performed on the plaintext of the payment key in the white box environment by using the key store management system, the SM4 white box secret key and the SM2 public key in combination. The SM4 white box secret key, the SM2 public key and the SM2 private key are generated by the back-end system based on the key store management system, so that the protection strength of the payment key may be effectively improved.

According to the decryption method for the payment key provided by the second aspect of the embodiments of the present application, the saved ciphertext of the payment key is read based on the encryption method described in the first aspect of the embodiment of the present application, the ciphertext of the payment key is sent to the back-end system, so that the back-end system uses the SM2 private key to decrypt the ciphertext of the payment key for the first time, and the ciphertext of the first decrypted payment key sent by the back-end system is received. Then, the AES key and the SM4 white box secret key are used to decrypt the ciphertext of the first decrypted payment key again to obtain the plaintext of the payment key. Thus, the decryption of the ciphertext of the payment key can only be realized by accessing the SM2 private key in the back-end system. However, the back-end system is prohibited from directly restoring the plaintext of the payment key, the plaintext of the payment key can only be obtained through a secondary decryption by using the AES key and the SM4 white box secret key, so that the protection strength of the plaintext of the payment key may be improved.

According to the payment authentication method provided by the third aspect of the embodiment of the present application, based on the decryption method described in the second aspect of the embodiment of the present application, payment data are collected, the payment data is encrypted through the plaintext of the payment key, the ciphertext of the payment data is generated. Then, the transaction data and the ciphertext of the payment data are encrypted to generate the transaction information. The transaction information is uploaded to the electronic payment system. The electronic payment system decrypts the transaction information and obtains the transaction data and the payment data, and verifies whether the payment data is legalized, authorizes the transaction corresponding to the transaction data when the payment data is legalized, or refuses the transaction corresponding to the transaction data when the payment data is illegal, and generates the payment feedback information. The payment feedback information issued by the electronic payment system is received. Dual encryption of the payment data may be realized on the premise of an effective protection of the plaintext of the encrypted secret key, so that the security of electronic payment is effectively guaranteed.

It may be understood that, regarding the beneficial effects of the fourth aspect and the fifth aspect, reference can be made to the relevant descriptions in the first aspect, the second aspect or the third aspect, the beneficial effects of the fourth aspect and the fifth aspect are not repeatedly described herein.

DESCRIPTION OF THE DRAWINGS

In order to describe the technical solutions in the embodiments of the present application more clearly, a brief introduction regarding the accompanying drawings needed to be used for describing the embodiments or the existing technology is given below. It is obvious that, the accompanying drawings described below are only some embodiments of the present application. A person of ordinary skill in the art may also obtain other drawings according to the current drawings without paying creative efforts.

DETAILED DESCRIPTION OF EMBODIMENTS

Figure 1:
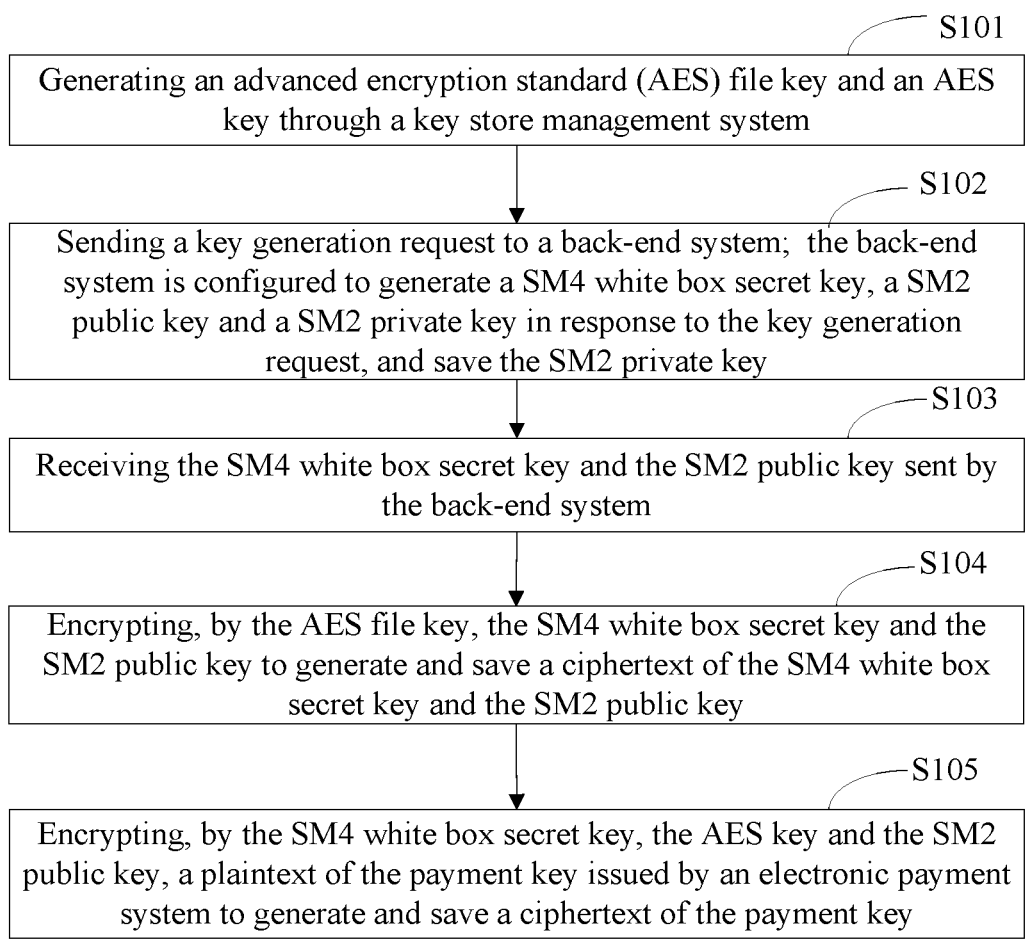
FIG. 1 illustrates a first schematic flow diagram of an encryption method in accordance with one embodiment of the present application.

In the following descriptions, in order to describe but not intended to limit the present application, concrete details including specific system structure and technique are proposed to facilitate a comprehensive understanding of the embodiments of the present application. However, a person of ordinarily skill in the art should understand that, the present application can also be implemented in some other embodiments from which these concrete details are excluded. In other conditions, detailed explanations of method, circuit, device and system well known to the public are omitted, such that unnecessary details which are disadvantageous to understanding of the description of the present application can be avoided.

It should be understood that, when a term "comprise/include" is used in the description and annexed claims, the term "comprise/include" indicates existence of the described characteristics, integer, steps, operations, elements and/or components, but not exclude existence or adding of one or more other characteristics, integer, steps, operations, elements, components and/or combination thereof.

It should be further understood that, terms "and/or" used in the description and the annexed claims of the present application are referred to as any combination of one or a plurality of listed item(s) associated with each other and all possible items, and including the combinations thereof.

As is used in the description and the annexed claims, a term "if" may be interpreted as "when" or "once" or "in response to determination" or "in response to detection". Similarly, terms such as "if it is determined that", or "if a described condition or event is detected" may be interpreted as "once it is determined" or "in response to the determination" or "once the described condition or event is detected" or "in response to the detection of the described condition or event".

In addition, in the descriptions of the present application, terms such as "first" and "second", "third", etc., are only used for distinguishing purpose in description, but shouldn't be interpreted as indication or implication of a relative importance.

The descriptions of "referring to one embodiment" or "referring to some embodiments", or the like as described in the specification of the present application means that a specific feature, structure, or characters which are described with reference to this embodiment are included in one embodiment or some embodiments of the present application. Thus, the sentences of "in one embodiment", "in some embodiments", "in some other embodiments", "in other embodiments", and the like in this specification are not necessarily referring to the same embodiment, but instead indicate "one or more embodiments instead of all embodiments", unless otherwise they are specially emphasize in other manner. The terms "comprising", "including", "having" and their variations mean "including but is not limited to", unless otherwise they are specially emphasized in other manner.

The encryption method for the payment key, the decryption method for the payment key, and the payment authentication method provided by the embodiment of this application may be applied to terminal devices, such as mobile phones, tablets, wearable devices, vehicle-mounted devices, augmented reality (Augmented Reality, AR)/virtual reality (Virtual Reality, VR) devices, laptops, ultra-mobile personal computers (Ultra-Mobile Personal Computers, UMPCs), netbooks, personal digital assistant (Personal Digital Assistant, PDA), etc. The specific types of the terminal devices are not limited in the present application.

In one embodiment, an operating system and an electronic payment application are installed in the terminal device. The operating system and the electronic payment application are stored in a memory of the terminal device. A processor of the terminal device operates the operating system. The operating system invokes and operates the electronic payment application to realize the encryption method for the payment key, or the decryption method for the payment key, or the payment authentication method.

In one embodiment, the operating system may be Android, iOS, Windows Phone, Symbian, BlackBerry OS, Web OS, Windows Mobile, Harmony, etc.

In one embodiment, the processor may be the central processing unit (Central Processing Unit, CPU). The processor may also be other general-purpose processor, digital signal processor (Digital Signal Processor, DSP), application specific integrated circuit (Application Specific Integrated Circuit, ASIC), field-programmable gate array (Field-Programmable Gate Array, FPGA) or other programmable logic device. Discrete gate or transistor logic devices, discrete hardware components, etc. The general-purpose processor may be a microprocessor or be any conventional processor, or the like.

In one embodiment, the memory may be an internal storage unit of the terminal device, such as a hard disk or an internal memory of the terminal device. The memory 20 may also be an external storage device of the terminal device, such as a plug-in hard disk, a smart media card (Smart Media Card, SMC), a secure digital (Secure Digital, SD) card, a flash card (Flash Card, FC) equipped on the terminal device. Furthermore, the memory 20 may not only include the internal storage unit of the terminal device, but also include the external memory of the terminal device. The memory is used to store the operating system, applications, Boot Loader, data and other procedures, such as program codes of a computer program. The memory may also be used to store data that has been output or being ready to be output temporarily.

Figure 2:
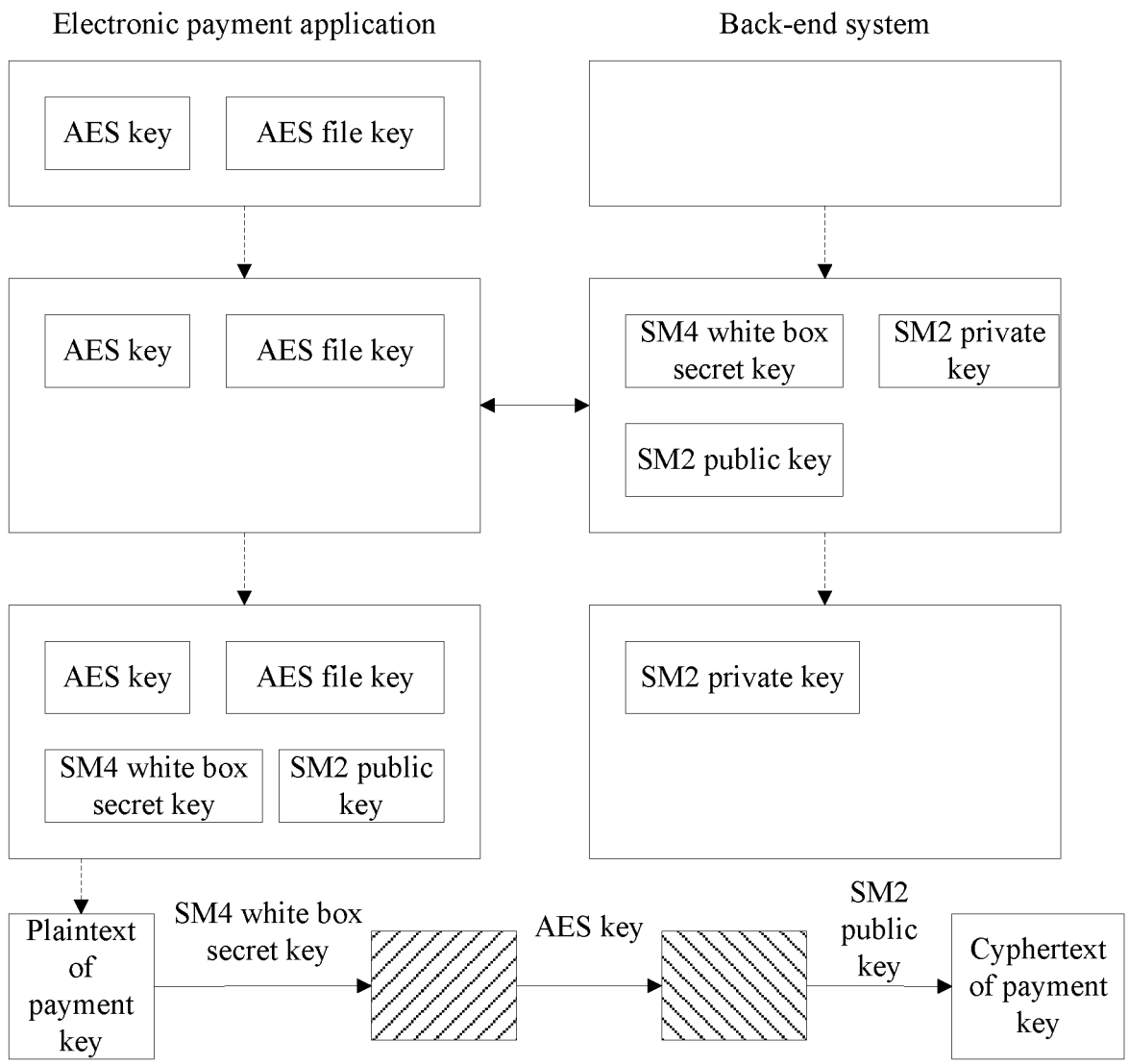
FIG. 2 illustrates a second schematic flow diagram of the encryption method in accordance with one embodiment of the present application.

As shown in FIG. 1 and FIG. 2, the encryption method for the payment key provided by one embodiment of the present application includes steps S101-S105, which are listed below:

In the step of S101, an advanced encryption standard (Advanced Encryption Standard, AES) file key and an AES key are generated through a key store management system.

In one embodiment, after the key store Management System uses an advanced encryption standard (Advanced Encryption Standard, AES) algorithm to generate the AES file key and the AES key, the AES file key and AES key will be automatically saved in the key store management system. The advanced encryption standard algorithm is a symmetric key encryption algorithm.

In the step of S102, a key generation request is sent to the back-end system. The back-end system is used to generate a SM4 white box secret key, a SM2 public key and a SM2 private key in response to the key generation request, and save the SM2 private key.

In one embodiment, after the AES file key and the AES key are generated, the electronic payment application sends the key generation request to the back-end system. After responding to the key generation request, the back-end system uses a state encryption algorithm SM4 to generate the SM4 white box secret key, uses a state encryption algorithm SM2 to generate the SM2 public key and the SM2 private key, and saves the SM2 private key in a host security module of the back-end system. Then, the back-end system sends the SM4 white box secret key and the SM2 public key to the electronic payment application. Before sending the SM4 white box secret key and the SM2 public key to the electronic payment application, the back-end system may also use a private key of the back-end system to perform digital signature on the SM4 white box secret key and the SM2 public key, and then send the SM4 white box secret key, the SM2 public key and a digital signature thereof to the electronic payment application, so that the security of transmission of the SM4 white box secret key and the SM2 public key is improved, and the SM4 white box secret key and the SM2 public key are prevented from being illegally tampered. The state encryption algorithm SM4 is a symmetric key encryption algorithm, and the state encryption algorithm SM2 is an asymmetric encryption algorithm.

In one embodiment, the back-end system may be operated on a computing device such as a server or a computer of a bank or a financial institution, or be operated on a computing device such as a server or a computer of an application developer of the electronic payment application. The application developer of the electronic payment application may also be a bank or a financial institution, or the like.

In the step of S103, the SM4 white box secret key and the SM2 public key sent by the back-end system are received.

In one embodiment, when the electronic payment application receives the SM4 white box secret key and the SM2 public key and the digital signature thereof, the electronic payment application uses a certificate of the back-end system to verify the digital signature first to prevent the SM4 white box secret key and the SM2 public key from being illegally tampered. When verification of the digital signature is passed, it can be determined that the SM4 white box secret key and the SM2 public key are not tampered.

In the step of S104, the AES file key is used to encrypt the SM4 white box secret key and the SM2 public key to generate and save a ciphertext of the SM4 white box secret key and the SM2 public key, the ciphertext of the SM4 white box secret key and the SM2 public key are saved.

In one embodiment, after receiving the SM4 white box secret key and SM2 public key sent by the back-end system, the electronic payment application may use the AES file key to encrypt the SM4 white box secret key and the SM2 public key together to obtain a ciphertext, and save the ciphertext in a private file of the electronic payment application. The AES file key may also be used to respectively encrypt the SM4 white box secret key and the SM2 public key to obtain the ciphertext of the SM4 white box secret key and the ciphertext of the SM2 public key, and save them in the private file of the electronic payment application.

In the step of S105, the SM4 white box secret key, the AES key and the SM2 public key are used to encrypt a plaintext of the payment key issued by the electronic payment system to generate a ciphertext of the payment key, and save the ciphertext of the payment key.

In one embodiment, after receiving the plaintext of the payment key issued by the electronic payment system, the ciphertext of the stored SM4 white box secret key and the SM2 public key, and the AES key are read from the private file of the electronic payment application, the AES file key is used to decrypt the ciphertext of the SM4 white box secret key and the SM2 public key. Then, the SM4 white box secret key, the AES key and the SM2 public key are used to encrypt the plaintext of the payment key to generate the ciphertext of the payment key, and the ciphertext of the payment key is stored in the private file of the electronic payment application.

In one embodiment, the back-end system may be operated on a computing device such as a server or a computer of a bank or a financial institution, or be operated on a computing device such as a server or a computer of an application developer of the electronic payment application. The application developer of the electronic payment application may also be a bank or a financial institution, or the like. The back-end system and the electronic payment system may be operated by computing devices of different institutions.

As shown in FIG. 2, in one embodiment, the step S105 includes:

The plaintext of the payment key issued by the electronic payment system is encrypted for the first time by the SM4 white box secret key, the payment key is encrypted for the second time by the AES key, and the payment key is encrypted for the third time by the SM2 public key, so that the ciphertext of the payment key is generated and saved.

In one embodiment, the plaintext of the payment key is encrypted by the SM4 white box secret key, the AES key and the SM2 public key in sequence to realize triple encryption of the plaintext of the payment key.

According to the embodiments corresponding to the FIG. 1 and the FIG. 2, encipherment protection for the plaintext of the payment key is performed by using the key store management system, the SM4 white box secret key and the SM2 public key in combination in a white box environment, and the SM4 white box secret key, the SM2 public key and the SM2 private key are generated through the back-end system on the basis of the key store management system, such that the protection strength can be effectively protected. According to the embodiment corresponding to FIG. 2, triple encryption is performed on the plaintext of the payment key, so that the strength of encryption protection of the plaintext of the payment key can be further improved.

Figure 3:
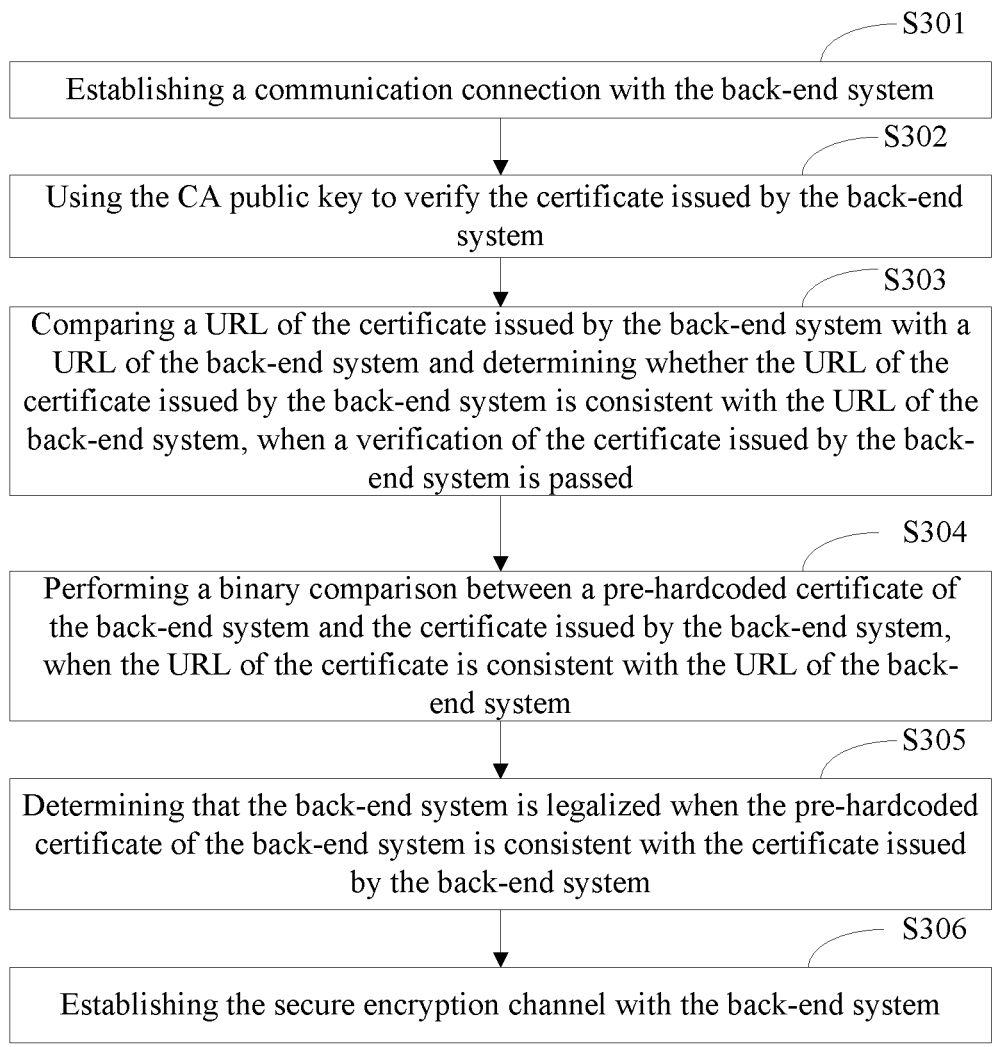
FIG. 3 illustrates a third schematic flow diagram of the encryption method in accordance with one embodiment of the present application.

As shown in FIG. 3, in one embodiment, before the step S102, the method further includes steps S301-S306, which are listed below:

In the step of S301, a communication connection is established with the back-end system.

In one embodiment, before sending the key generation request to the back-end system, it is necessary to establish a secure encryption channel with the back-end system, and then transmit interactive data between two participants in communication through the secure encryption channel, thereby ensuring data security. When the electronic payment application is published, a certificate authority (Certificate Authority, CA) public key issued by a certificate authority (Certificate Authority, CA) and a certificate of the back-end system will be hard-coded into the codes of the electronic payment application, and are published together with the electronic payment application. The private key of the background server and the certificate of the back-end system are stored in the host security module of the back-end system when they are initialized firstly. After a communication link between the electronic payment application and the back-end system is established and the communication connection between the electronic payment application of the terminal device and the back-end system is realized, the electronic payment application may perform a one-way authentication on the legitimacy of the back-end system through a TLS1.3 protocol, and establishes the secure encryption channel with the back-end system when a verification result indicates that the back-end system is legitimate.

In the step of S302, the CA public key is used to verify the certificate issued by the back-end system.

In the step of S303, a uniform resource locator (Uniform Resource Locator, URL) of the certificate issued by the back-end system is compared with a URL of the back-end system and whether the URL of the certificate issued by the back-end system is consistent with the URL of the back-end system is determined, when a verification of the certificate issued by the back-end system is passed.

In the step of S304, a binary comparison between a pre-hardcoded certificate of the back-end system and the certificate issued by the back-end system is performed, when the URL of the certificate is consistent with the URL of the back-end system.

In the step of S305, legalization of the back-end system is determined when the pre-hardcoded certificate of the back-end system is consistent with the certificate issued by the back-end system.

In the step of S306, the secure encryption channel between the electronic payment application of the terminal device and the back-end system is established.

In one embodiment, a process of performing the one-way authentication on the legitimacy of the back-end system is described below:
step 1, the electronic payment application uses the CA public key to verify the certificate issued by the back-end system firstly;
step 2, when the verification of the certificate issued by the back-end system is passed, whether the uniform resource locator (URL) of the certificate issued by the back-end system is consistent with the URL of the back-end system is determined by comparison;
step 3, when the URL of the certificate is consistent with the URL of the back-end system, the binary comparison between the pre-hardcoded certificate of the back-end system and the certificate issued by the back-end system is performed;
step 4, the back-end system is determined to be legitimate, so that the electronic payment application may establish a secure encryption channel with the back-end system, only when the certificate of the back-end system is consistent with the certificate issued by the back-end system, in other words, when all the aforesaid three verification operations have been successfully passed.

In one embodiment, the step S102 includes:
the key generation request is sent to the back-end system through the secure encryption channel.

In one embodiment, the step S103 includes:
the SM4 white box secret key and the SM2 public key sent by the back-end system through the secure encryption channel are received.

In one embodiment, since the SM4 white box secret key and the SM2 public key are not classified into particularly sensitive information, so that the SM4 white box secret key and the SM2 public key may be encrypted and transmitted directly based on the secure encryption channel, there is no need to perform a second encipherment protection on the SM4 white box secret key and the SM2 public key based on the secure encryption channel.

According to the embodiment corresponding to FIG. 3, the secure encryption channel between the electronic payment application and the back-end system, so that the data interaction between the electronic payment application and the back-end system is realized, the security of the data interaction between the electronic payment application and the back-end system can be effectively ensured.

Figure 4:
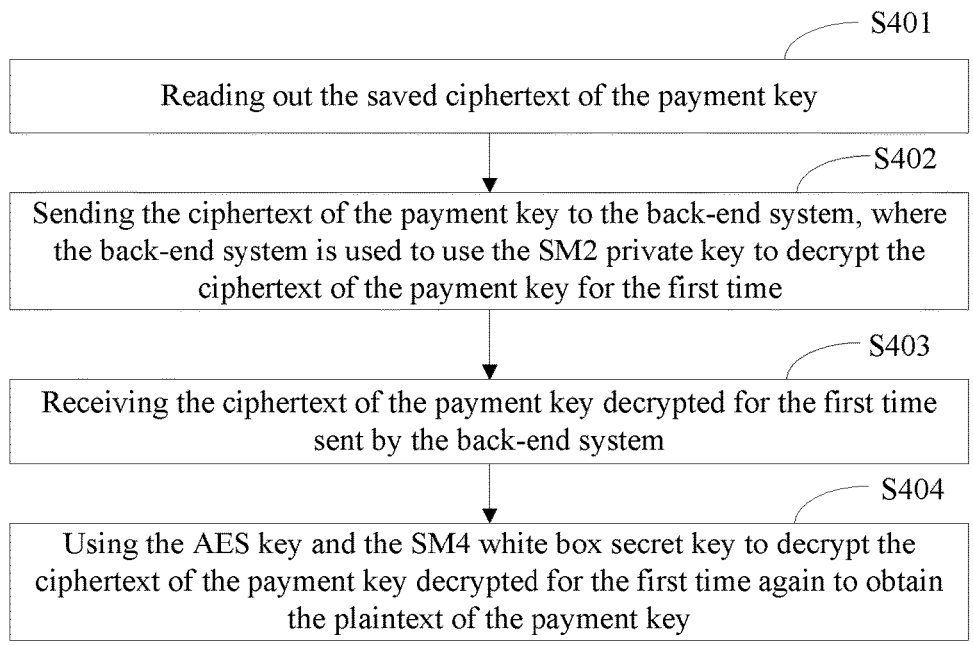
FIG. 4 illustrates a first schematic flow diagram of a decryption method in accordance with one embodiment of the present application.
Figure 5:
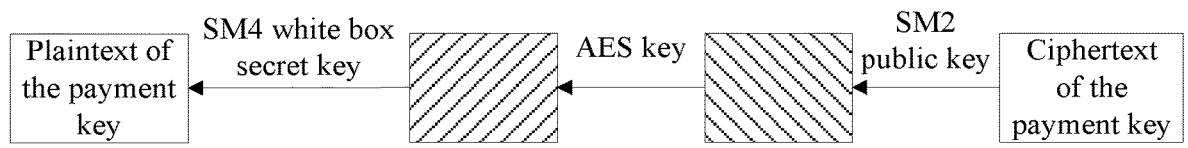
FIG. 5 illustrates a second schematic flow diagram of the encryption method in accordance with one embodiment of the present application.

As shown in FIG. 4 and FIG. 5, based on the aforesaid encryption method embodiment, a decryption method for the payment key provided by one embodiment of the present application includes steps S401-S404, which are listed below:

In the step of S401, the saved ciphertext of the payment key is read out.

In one embodiment, when the saved ciphertext of the payment key is decrypted, it is necessary to read the ciphertext of the payment key from the private file of the electronic payment application.

In the step of S402, the ciphertext of the payment key is sent to the back-end system. The back-end system is used to use the SM2 private key to decrypt the ciphertext of the payment key for the first time.

In one embodiment, before decrypting the ciphertext of the payment key read out from the private file of the electronic payment application, the ciphertext of the payment key needs to be sent to the back-end system. In particular, the ciphertext of the payment key may be sent to the back-end system through the secure encryption channel. After receiving the ciphertext of the payment key, the back-end system uses the SM2 private key stored in the host security module thereof to decrypt the ciphertext of the payment key for the first time, and then sends it to the electronic payment application. In particular, the ciphertext of the first decrypted payment key may be sent to the electronic payment application through the secure encryption channel.

In the step of S403, the ciphertext of the first decrypted payment key sent by the back-end system is received.

In the step of S404, the AES key and the SM4 white box secret key are used to decrypt the ciphertext of the first decrypted payment key again to obtain the plaintext of the payment key.

In one embodiment, after receiving the ciphertext of the first decrypted payment key that has been decrypted for the first time, the electronic payment application uses the AES key and the SM4 white box secret key to decrypt the ciphertext of the payment key, so that the plaintext of the payment key is finally obtained.

As shown in FIG. 5, in one embodiment, the step S404 includes:
The AES key is used to decrypt the ciphertext of the payment key for the second time, the SM4 white box secret key is used to decrypt the ciphertext of the payment key for the third time, so that the plaintext of the payment key is obtained.

In one embodiment, the ciphertext of the payment key is decrypted by the SM2 private key, the AES key and the SM4 white box secret key in sequence, and the plaintext of the payment key is finally obtained after three times of decryption.

According to the embodiment corresponding to FIG. 4, a decryption operation on the ciphertext of the payment key can only be realized by accessing the SM2 private key in the back-end system, however, the back-end system is prohibited from directly restoring the plaintext of the payment key. The plaintext of the payment key can only be obtained after being decrypted by the AES key and the SM4 white box secret key again, so that the protection strength of the plaintext of the payment key is improved. According to the embodiment corresponding to FIG. 5, the plaintext of the payment key can only be obtained by decrypting the ciphertext of the payment key three times, so that the protection strength of the plaintext of the payment key is further improved.

Figure 6:
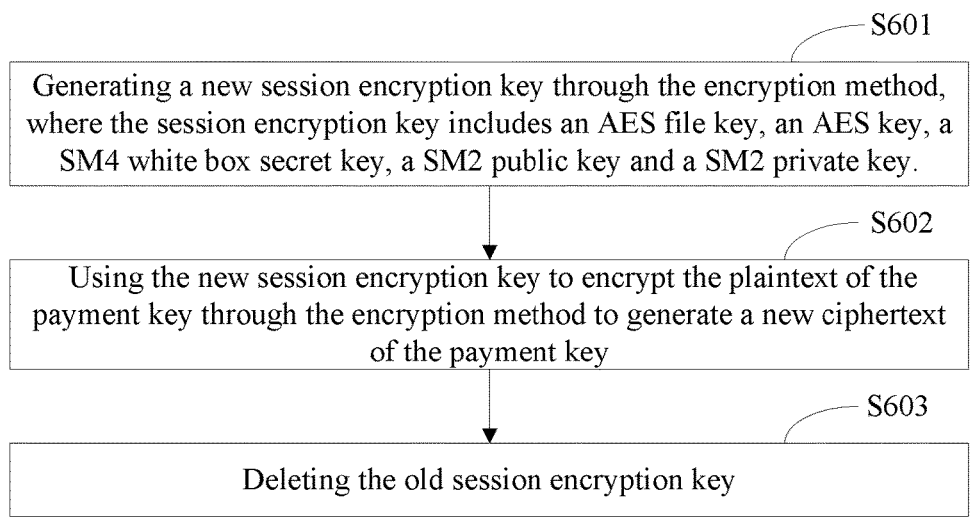
FIG. 6 illustrates a first schematic flow diagram of an upgrading method in accordance with one embodiment of the present application.
Figure 7:
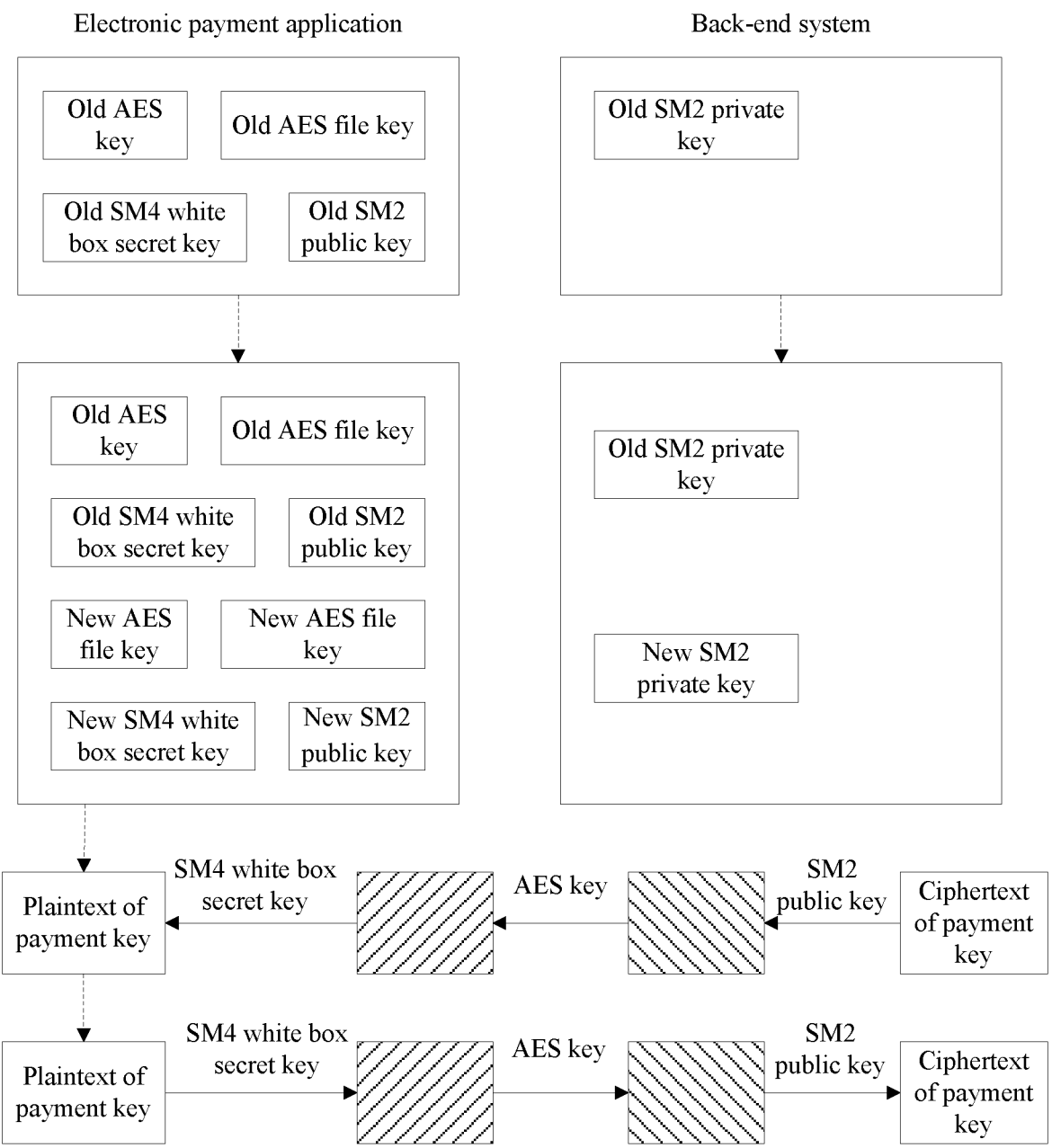
FIG. 7 illustrates a second schematic flow diagram of the upgrading method in accordance with one embodiment of the present application.

As shown in FIG. 6 and FIG. 7, based on the aforesaid encryption method embodiments and the decryption method embodiments, a method of upgrading a session encryption key (SEK) is further provided in the present application, this method including steps S601-S603, which are listed below:

In a step of S601, a new session encryption key is generated through the encryption method. The session encryption key includes an AES file key, an AES key, a SM4 white box secret key, a SM2 public key and a SM2 private key.

In one embodiment, the SEK needs to be updated in order to improve security after being used for a period of time. The method for upgrading the session encryption key is the same as the process and the principle of generating the AES file key, the AES key, the SM4 white box secret key, the SM2 public key and the SM2 private key in the aforesaid encryption method, and includes the following steps:

generating a new AES file key and a new AES key through the key store management system;

sending a new key generation request to the back-end system, where the back-end system is used to generate a new SM4 white box secret key, a new SM2 public key and a new SM2 private key in response to the new key generation request, and save the new SM2 private key;

receiving the new SM4 white box secret key and the new SM2 public key sent by the back-end system;

using the AES file key to encrypt the new SM4 white box secret key and the new SM2 public key to generate the ciphertext of the new SM4 white box secret key and the new SM2 public key, and save the ciphertext of the new SM4 white box secret key and the new SM2 public key.

In the step of S602, the new session encryption key is used to encrypt the plaintext of the payment key through the encryption method to generate a new ciphertext of the payment key.

In one embodiment, after the new session encryption key is generated, the process and the principle as same as the aforesaid encryption method are continued to be used to encrypt the plaintext of the payment key, which includes the following steps:

encrypting the plaintext of the payment key issued by the electronic payment system by the new SM4 white box secret key, the new AES key and the new SM2 public key to generate the ciphertext of the payment key, and saving the ciphertext of the payment key.

In the step of S603, the old session encryption key is deleted.

In one embodiment, the old session encryption key refers to the AES file key, the AES key, the SM4 white box secret key, the SM2 public key and the SM2 private key before they are updated. After the old session encryption key is updated, the old session encryption key may not be deleted. In this condition, the electronic payment application saves the new and old session encryption keys at the same time. In this case, both the new encryption key and the old session encryption key can be used normally. It is in a transition period between the new encryption key and the old session encryption key. Once the old session encryption key is deleted, the new session encryption key can only be used. A condition that the electronic payment application may save all session encryption keys updated in the past period of time at the same time is not excluded, that is, the electronic payment application may save at least two session encryption keys at the same time.

According to the embodiments corresponding to FIG. 6 and FIG. 7, a risk of cracking of the session encryption key when the session encryption key has been used for a long time may be effectively reduced by updating the session encryption key.

Figure 8:
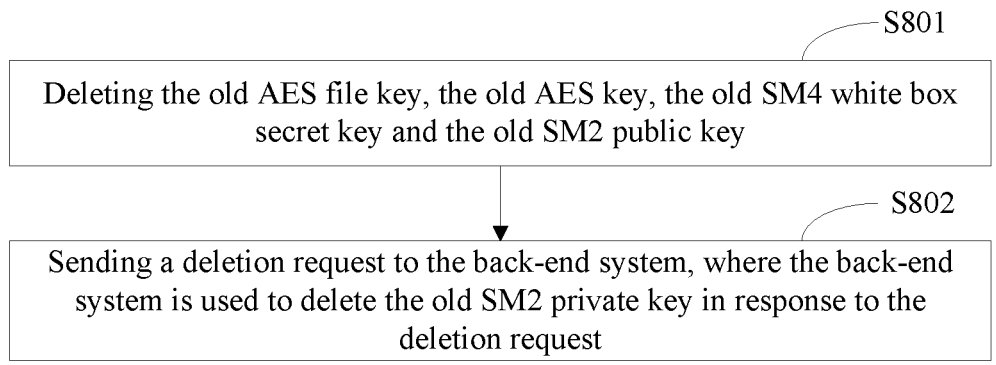
FIG. 8 illustrates a first schematic flow diagram of a deletion method in accordance with one embodiment of the present application.
Figure 9:
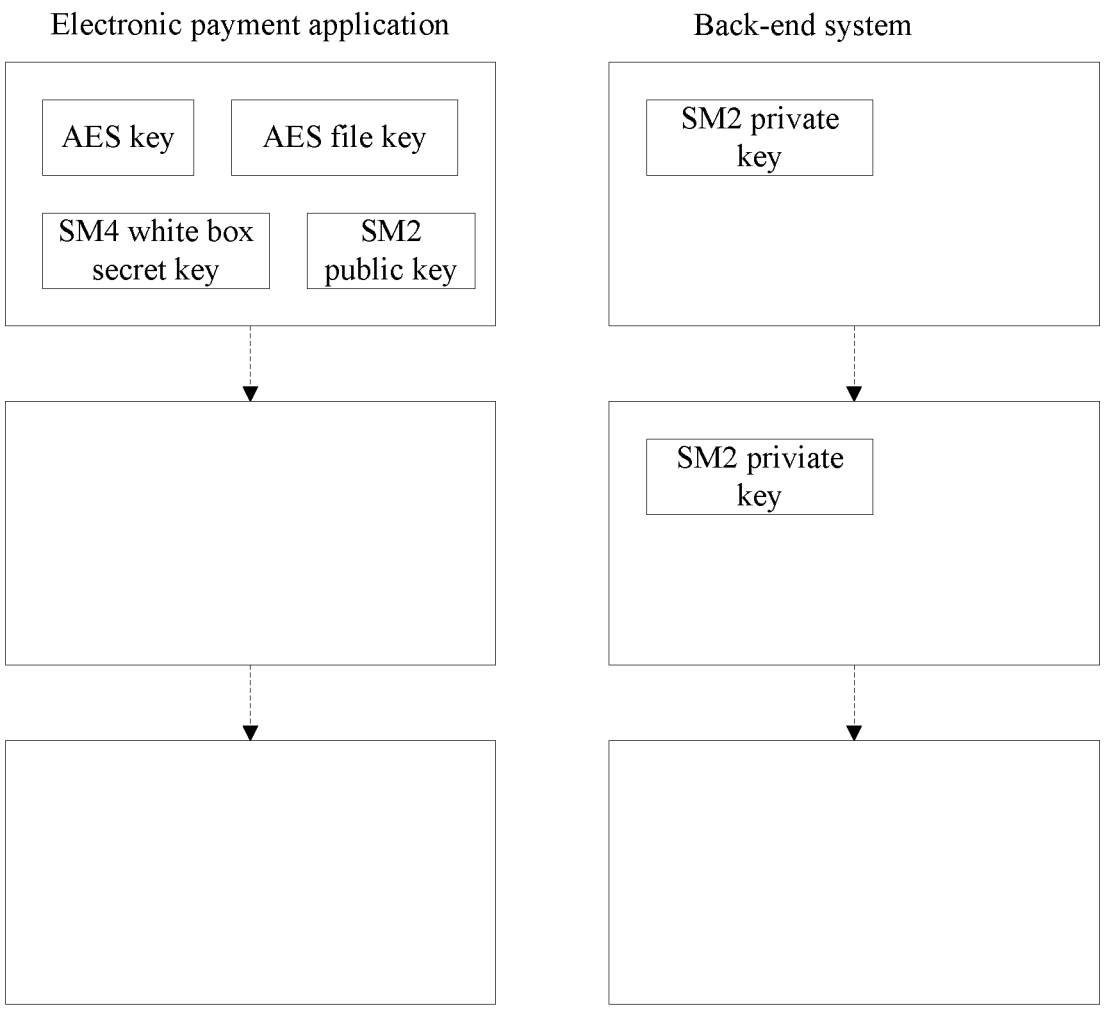
FIG. 9 illustrates a second schematic flow diagram of the deletion method in accordance with one embodiment of the present application.

As shown in FIG. 8 and FIG. 9, in one embodiment, based on the embodiments of the encryption method, the decryption method or the update method, a method for deleting the session encryption key is further provided in the present application. This method includes steps S801-S802, which are listed below:

In the step of S801, the old AES file key, the old AES key, the old SM4 white box secret key and the old SM2 public key are deleted.

In one embodiment, there are two conditions in which the session encryption key needs to be deleted. One condition is that the old session encryption key may be deleted and the new session encryption key is only kept after updating of the old session encryption key has been accomplished. The other condition is that the session encryption key needs to be deleted when the electronic payment application detects that the payment environment is insecure. That is, the operation of deletion of the session encryption key may be performed on the basis of any one of the embodiments of the encryption method, the decryption method and the update method. The old session encryption key may be deleted merely. As an alternative, all session encryption key may be deleted.

As shown in FIG. 9, in one embodiment, the step S801 includes:

deleting the old AES file key and the old AES key;

setting the old SM4 white box secret key and the old SM2 public key to 0.

In one embodiment, the electronic payment application needs to delete the AES file key and the AES key, and set the SM4 white box secret key and SM2 public key to 0 when deleting the AES file key, the AES key, the SM4 white box secret key and the SM2 public key.

In the step of S802, a deletion request is sent to the back-end system. The back-end system is used to delete the old SM2 private key in response to the deletion request.

In one embodiment, when the electronic payment application has deleted the AES file key, the AES key, the SM4 white box secret key and the SM2 public key, the electronic payment application sends the deletion request for deleting the SM2 private key to the back-end system. After receiving the deletion request, the back-end system performs a deletion operation on the SM2 private key in response to the deletion request.

According to the embodiments corresponding to FIG. 8 and FIG. 9, the session encryption key may be updated by deleting the old session encryption key, the session encryption key can also be prevented from being tampered when the payment environment is insecure.

Figure 10:
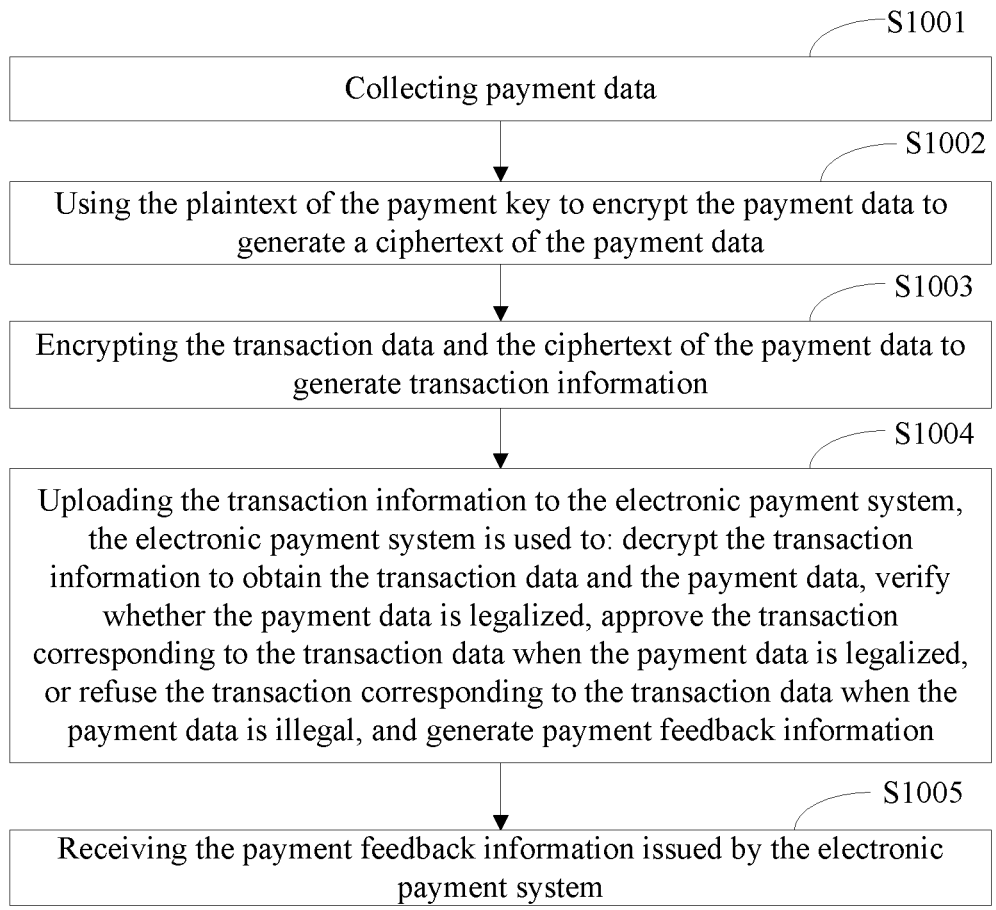
FIG. 10 illustrates a schematic flow diagram of a payment authentication method in accordance with one embodiment of the present application.

As shown in FIG. 10, based on the embodiments of the decryption method or the update method, a payment authentication method is further provided in the present application, the payment authentication method includes steps S1001-S1005, which are listed below:

In the step of S1001, payment data is collected.

In one embodiment, methods for collecting payment data are also different according to different electronic payment methods supported by electronic payment applications. For example, the electronic payment application may support at least one of payment with card and payment without card. When payment with card is supported, payment data of at least one of a magnetic card, a contacted integrated circuit card and a non-contacted card may be collected through a card reader. When payment without card is supported, at least one of biometric data, password data, coding data and digital certificate data may be collected through a human-computer interaction device supported by the terminal device. Biometric data may include face data based on face recognition, finger print data based on fingerprint recognition technology, electronic signature data based on electronic signature recognition technology, voiceprint data based on voiceprint recognition technology, etc. Electronic signature refers to the data in an electronic form contained or carried in a data message and used for recognizing an identity of a signer and indicate the signer's approval of the contents. The password authentication data is user data used for logging in through a user name and a password. The password may be a fixed password set by the user, or be a dynamic password (i.e., dynamic cipher) generated by a payment-related computing device. The code authentication data may include one-dimensional code data based on one-dimensional code recognition technology or two-dimensional code data based on two-dimensional code recognition technology. The one-dimensional code may refer to one-dimensional barcode. Digital certificate refers to a digital authentication for indicating the identity information of each of the participants in communication in Internet communication. The digital certificate may be used for identity recognition in the Internet. Digital certificate includes a mobile certificate and a browser certificate. Regarding the mobile certificate, a U-KEY carrier is used as a device for encrypting and storing the digital certificate, regarding the browser certificate, a computer carrier is used as the device for downloading and installing the digital certificate.

In one embodiment, the card reader may include a magnetic card reader, a contact IC card reader, a non-contact card reader, etc. The non-contact card reader may be a near field communication (Near Field Communication, NFC) card reader. The human-computer interaction device may include a camera, a fingerprint module, an electronic signature panel, a microphone and other biological feature acquisition device used for collecting biometric data, a keyboard and a touch screen used for collecting password data, a code acquisition device for collecting codes, such as a camera or a barcode scanner used for collecting codes, and a U-key used for collecting digital certificates. The electronic signature panel may be replaced with the touch screen.

In the step of S1002, the plaintext of the payment key is used to encrypt the payment data to generate a ciphertext of the payment data.

In one embodiment, when the payment data needs to be encrypted, the ciphertext of the payment key is read from the private file of the electronic payment application, then, the ciphertext of the payment key is decrypted by the session encryption key to obtain the plaintext of the payment key. When the plaintext of the payment key is used to encrypt the payment data, the plaintext of the payment key will be momently stored in the memory of the terminal device. After encryption of the payment data is completed, the plaintext of the payment key in the memory must be cleared immediately to prevent the plaintext of the payment key from being stolen or tampered, so that payment security is ensured.

In the step of S1003, the transaction data and the ciphertext of the payment data are encrypted to generate transaction information.

In one embodiment, after the payment data is encrypted, any encryption algorithm may be used to encrypt the transaction data and the ciphertext of the payment data for a second time to generate the transaction information.

In the step of S1004, the transaction information is uploaded to the electronic payment system. The electronic payment system is used to: decrypt the transaction information to obtain the transaction data and the payment data, verify whether the payment data is legalized, authorize the transaction corresponding to the transaction data when the payment data is legalized, or refuse the transaction corresponding to the transaction data when the payment data is illegal, and generate payment feedback information.

In one embodiment, after the transaction information is generated, the transaction information is transferred to the electronic payment system for performing transaction verification. After the electronic payment system receives the transaction information, the electronic payment system decrypts the transaction information to obtain the transaction data and payment data firstly, and then verifies whether the payment data is legalized. If the payment data is legalized, the transaction is authorized; otherwise, the transaction is refused, and the corresponding payment feedback information is sent to the electronic payment application. The payment feedback information may include information indicating a success of the transaction, information indicating a failure of the transaction, information indicating insufficient balance, and information indicating a failure of verification of the payment data.

In the step of S1005, the payment feedback information issued by the electronic payment system is received by the electronic payment application.

In one embodiment, after receiving the payment feedback information, the electronic payment application may use any human-computer interaction method supported by the terminal device to inform the user of a transaction result. For example, the electronic payment application may inform the user of the transaction result in the manner of displaying, voicing, image, and the like.

According to the embodiment corresponding to FIG. 10, dual encryption of the payment data may be realized at the premise of effective protection of the plaintext of the session encryption key, so that the security of electronic payment may be effectively guaranteed.

It should be understood that, the values of serial numbers of the steps in the aforesaid embodiments do not indicate an order of execution sequences of the steps. Instead, the execution sequences of the steps should be determined by functionalities and internal logic of the steps, and thus shouldn't be regarded as limitation to implementation processes of the embodiments of the present application.

Figure 11:
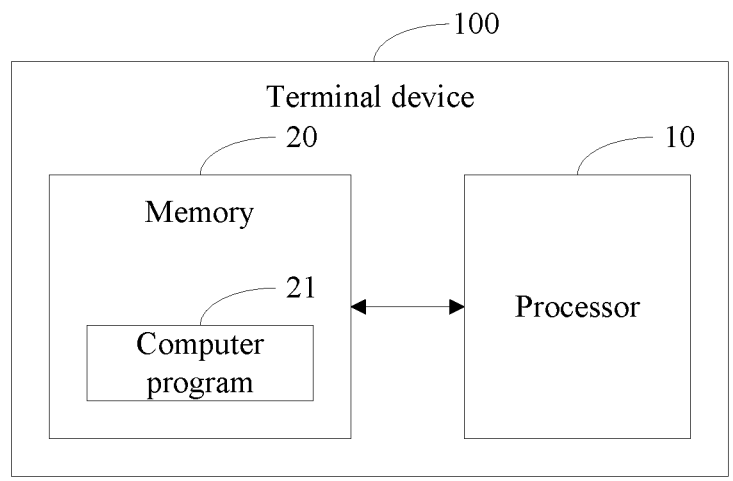
FIG. 11 illustrates a schematic structural block diagram of a terminal device in accordance with one embodiment of the present application.

As shown in FIG. 11, a terminal device 100 provided by one embodiment of the present application includes: at least one processor 10 (only one processor is shown in FIG. 1), a memory 20 and a computer program stored in the memory 20 and executable by the at least one processor 10. The processor 10 is configured to, when executing the computer program 21, implement the steps in the various method embodiments.

The terminal device may include but is not limited to the processor and the memory. More or less components than the components shown in FIG. 11 may be included, or some components or different components may be combined. For example, the terminal device may also include an input and output device, a network access device, a bus, etc.

A computer-readable storage medium is further provided in one embodiment of the present application. The computer-readable storage medium stores a computer program, that, when executed by the processor of the terminal device, causes the processor of the terminal device to implement the steps in the various method embodiments.

A computer program product is further provided in one embodiment of the present application. When the computer program product is executed by the terminal device, the terminal device is caused to implement the steps in the various method embodiments.

The computer readable medium may at least include: recording medium, computer memory, read-only memory (Read-Only Memory, ROM), random access memory (Random Access Memory, RAM).

The aforesaid embodiments are merely used to explain the technical solutions of the present invention, and are not intended to limit the technical solutions of the present invention. Although the present invention has been described in detail with reference to the embodiments described above, a person of ordinary skill in the art should understand that the technical solutions described in these embodiments may still be modified, or some or all technical features in the embodiments may be equivalently replaced. However, these modifications or replacements do not make the essences of corresponding technical solutions to break away from the spirit and the scope of the technical solutions of the embodiments of the present application.

What is claimed is:

1. An encryption method for a payment key implemented by a terminal device, comprising:
    generating an advanced encryption standard (AES) file key and an AES key through a key store management system;
    sending, by an electronic payment application of the terminal device, a key generation request to a back-end system; and generating, by the back-end system, a SM4 white box secret key, a SM2 public key and a SM2 private key in response to the key generation request, and saving the SM2 private key;
    receiving, by the electronic payment application of the terminal device, the SM4 white box secret key and the SM2 public key sent by the back-end system;
    encrypting, by the electronic payment application of the terminal device, the SM4 white box secret key and the SM2 public key by using the AES file key to generate and save a ciphertext of the SM4 white box secret key and the SM2 public key; and
    encrypting, by the electronic payment application of the terminal device, a plaintext of the payment key issued by an electronic payment system by using the SM4 white box secret key, the AES key and the SM2 public key to generate and save a ciphertext of the payment key in a private file of the electronic payment application.

2. The encryption method according to claim 1, wherein said encrypting, by the electronic payment application of the terminal device, the plaintext of the payment key issued by the electronic payment system by using the SM4 white box secret key, the AES key and the SM2 public key to generate and save the ciphertext of the payment key in the private file of the electronic payment application comprises:
    by the electronic payment application of the terminal device, encrypting the plaintext of the payment key issued by the electronic payment system for a first time by using the SM4 white box secret key, and encrypting the payment key for a second time by using the AES key, and encrypting the payment key for a third time by using the SM2 public key to generate the ciphertext of the payment key, and saving the ciphertext in the private file of the electronic payment application.

3. The encryption method according to claim 1, wherein before sending, by the electronic payment application of the terminal device, the key generation request to the back-end system, the method further comprises:
    establishing a secure encryption channel between the electronic payment application and the back-end system;
    said sending, by the electronic payment application of the terminal device, the key generation request to the back-end system comprises:
    sending, by the electronic payment application of the terminal device, the key generation request to the back-end system through the secure encryption channel;
    said receiving, by the electronic payment application of the terminal device, the SM4 white box secret key and the SM2 public key sent by the back-end system comprises:
    receiving, by the electronic payment application of the terminal device, the SM4 white box secret key and the SM2 public key sent by the back-end system through the secure encryption channel.

4. The encryption method according to claim 3, wherein before establishing the secure encryption channel between the electronic payment application and the back-end system, the method further comprises:
    establishing a communication connection between the terminal device and the back-end system;
    using, by the electronic payment application of the terminal device, a CA public key to verify a certificate issued by the back-end system;
    comparing, by the electronic payment application of the terminal device, a URL of the certificate issued by the back-end system with a uniform resource locator (URL) of the back-end system to determine whether the URL of the certificate issued by the back-end system is consistent with the URL of the back-end system when a verification of the certificate issued by the back-end system is passed;
    performing, by the electronic payment application of the terminal device, a binary comparison between a pre-hardcoded certificate of the back-end system and the certificate issued by the back-end system when the URL of the certificate is consistent with the URL of the back-end system; and
    determining a legalization of the back-end system by the electronic payment application of the terminal device when the pre-hardcoded certificate of the back-end system is consistent with the certificate issued by the back-end system.

* * * * *